United States Patent [19]

Baker

[11] 4,256,605
[45] Mar. 17, 1981

[54] SURFACTANT COMPOSITION, AND CONCENTRATE AND EMULSION INCLUDING SAME

[75] Inventor: Alan S. Baker, Slough, England

[73] Assignee: Imperial Chemical Industries Limited, London, England

[21] Appl. No.: 19,333

[22] Filed: Mar. 12, 1979

[30] Foreign Application Priority Data

Mar. 23, 1978 [GB] United Kingdom ............... 11679/78

[51] Int. Cl.$^3$ ....................... B01J 13/00; B01F 17/36
[52] U.S. Cl. .................................... 252/312; 210/925; 252/49.5; 252/79; 252/356
[58] Field of Search ............................... 252/312, 356; 210/DIG. 27; 526/15

[56] References Cited

U.S. PATENT DOCUMENTS

| | | | |
|---|---|---|---|
| 2,993,773 | 7/1961 | Stromberg | 44/70 X |
| 3,045,042 | 7/1962 | Staker | 252/390 X |
| 3,057,890 | 10/1962 | De Groote | 252/56 D X |
| 3,255,108 | 6/1966 | Wiese | 252/32.7 E |
| 3,996,134 | 12/1976 | Osborn et al. | 210/DIG. 27 |

FOREIGN PATENT DOCUMENTS

1055337  1/1967  United Kingdom ................ 252/56 D

*Primary Examiner*—Richard D. Lovering
*Attorney, Agent, or Firm*—Cushman, Darby & Cushman

[57] ABSTRACT

Compositions useful as surfactants in the emulsification of oils in aqueous media are obtained by blending two types of polyester which are the products of condensation of an alk(en)yl succinic anhydride with a polyalkylene glycol, the one type being derived from an anhydride in which the alk(en)yl group contains 40–500 carbon atoms, e.g. polyisobutenyl succinic anhydride, and the other type being derived from an anhydride in which the alk(en)yl group contains 8–18 carbon atoms, e.g. dodecenyl succinic anhydride. The compositions are superior in effect to either type of polyester separately, in enabling emulsions of high stability to be produced with a low energy input.

11 Claims, No Drawings

SURFACTANT COMPOSITION, AND CONCENTRATE AND EMULSION INCLUDING SAME

This invention relates to novel compositions which are useful as surfactants for the emulsification of oils in aqueous media. It also relates to oil-in-water type emulsions which incorporate the novel compositions.

The published literature contains numerous references to the use of derivatives of alkylsuccinic or alkenylsuccinic acids as detergents or surface-active materials. Thus, British Pat. No. 1 055 337 describes esters obtained by the reaction of a saturated hydrocarbon-substituted succinic anhydride, containing at least 50 aliphatic carbon atoms in the substituent group, with a polyhydric alcohol such as an alkylene glycol or a polyalkylene glycol and the use of such esters as additives for the purpose of imparting detergent properties to lubricants. U.S. Pat. No. 3,255,108 describes stable water-in-oil emulsions made with the aid of similar esters. Preferred esters for these applications are stated to be those in which the hydrocarbon substituent of the succinic acid radical is derived from a polymer of a mono-olefin having a molecular weight of from 750 to 5000. Other publications describe esters of substituted succinic acids in which the substituents are much shorter aliphatic chains than these, for example alkenyl groups containing 12 or 18 carbon atoms. U.S. Pat. No. 3,057,890 describes esters of such acids with polyalkylene glycol mixtures and the use of the esters as demulsifying agents for water-in-oil emulsions.

It has not previously been suggested, however, that there might be any special merit in blending esters of long-chain substituted succinic acids with esters of short-chain substituted succinic acids. We have now found that certain such mixtures show unexpected snyergistic surfactant properties which are of value for the emulsification of oils in aqueous media.

According to the present invention there is provided a surfactant composition which comprises (a) from 5% to 95%, preferably, as shown in the examples, 50% to 80% by weight of a polyester obtained by the condensation of (i) an alk(en)yl succinic anhydride of the formula

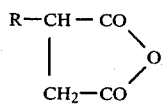

where R is a saturated or unsaturated hydrocarbon substituent derived from a polymer of mono-olefin, the said polymer chain containing from 40-500 carbon atoms, and preferably, as shown in the examples, having a molecular weight of about 600 to 1000, and (ii) a polyalkylene glycol which has a molecular weight of 400 to 20,000 and is soluble in water to the extent of at least 5% by weight at 25° C., the polyester so obtained containing 10% to 80%, preferably 20% to 60%, by weight of residues of the polyalkylene glycol (ii); and (b) from 95% to 5%, preferably, as shown in the examples, 50% to 20% by weight of a polyester obtained by the condensation of (iii) an alk(en)yl succinic anhydride of the formula

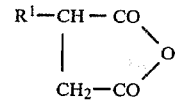

where $R^1$ is an alkyl or alkenyl radical containing from 8 to 18 carbon atoms, and preferably, as shown in the examples, from 12 to 18 carbon atoms, and (iv) a polyalkylene glycol which has a molecular weight of 200 to 4,000 and is soluble in water to the extent of at least 5% by weight at 25° C., the polyester so obtained containing from 10% to 80%, preferably 20% to 60%, by weight of residues of the polyalkylene glycol (iv), and the stated weight percentages of the components (a) and (b) respectively in the composition being based upon the combined weights of those components.

The alk(en)yl succinic anhydrides (i) and (iii) which are used in making the polyester components (a) and (b) respectively are known commercial materials. By an addition reaction between a polyolefin containing a terminal unsaturated group, or a mono-olefin, as the case may be, and maleic anhydride at an elevated temperature, usually in the presence of a catalyst such as a halogen, those members of the class are obtained in which the group R and $R^1$ as depicted in the above formulae retains an unsaturated linkage. By subsequent hydrogenation, these products can be converted into those members of the class in which R or $R^1$ is saturated. For making the anhydrides (i), suitable polyolefins include those obtained by polymerising a mono-olefin containing from 2 to 6 carbon atoms, for example ethylene, propylene, butylene, isobutylene and mixtures thereof, the derived polymers containing from 40 to 500 carbon atoms in the chain as stated above. For making the anhydrides (iii), suitable mono-olefins include those containing from 8 to 18 carbon atoms, for example nonene, decene, dodecene and octadecene.

A preferred alk(en)yl succinic anhydride of type (i) is (polyisobutenyl) succinic anhydride containing from 50 to 200 carbon atoms in the alkenyl chain.

A preferred alk(en)yl succinic anhydride of type (iii) is dodecenyl succinic anhydride.

The alk(en)yl succinic anhydrides (i) and (iii) may, however, if desired each be a mixture of two or more different compounds which respectively satisfy the foregoing definitions.

The polyalkylene glycols (ii) and (iv) which are used in making the polyesters (a) and (b) respectively may be, for example, polyethylene glycols, mixed poly(ethylene-propylene) glycols or mixed poly(ethylene-butylene) glycols, provided that they satisfy the molecular weight and water-solubility requirements hereinabove stated. In order for the polyalkylene glycols to have the requisite water solubility, they will normally need to contain at least a major proportion of oxyethylene repeat units. The polyalkylene glycols are also commercially available materials, and a single such compound or a mixture of two or more such compounds differing in composition and/or molecular weight may be used in making each of the polyesters (a) and (b), if desired.

Preferred polyalkylene glycols for use in making the polyester (a) and the polyester (b) are polyethylene glycols of average molecular weight 400 to 1000 respectively.

In addition to the polyalkylene glycol(s), other polyols such as glycerol, trimethylol propane, pentaerythritol and sorbitol may be incorporated in order to adjust the overall functionality of the components and/or increase the degree of branching of the polymers.

The relative proportions of the constituents (i) and (ii), or (iii) and (iv) as the case may be, which are used in making the polyesters (a) and (b) are chosen in accordance with the principles which are well known in the polyester and alkyd resin art, consistent with satisfying the above-stated requirements as to the content in the polyesters of the polyalkylene glycol residues (ii) and (iv) respectively. In general, the proportions are chosen so as to approach a stoichiometric balance between the carboxyl groups derived from the anhydride (i) or (iii) and the hydroxyl groups supplied by the glycol (ii) or (iv), respectively. Preferably this balance, and/or the degree to which the constituents are condensed together, are chosen so that the polyester has an acid value of less than 50 mg KOH/g, preferably less than 25 mg KOH/g.

There may if desired also be included in the constituents, from which the polyester (a) or the polyester (b) is made, a monobasic fatty acid such as caproic acid, whereby the characteristics of the polyester may be controlled independently of the degree of condensation of the constituents from which it is formed. Furthermore, there may also optionally be included polybasic acids such as are well known for use in the manufacture of polyesters or alkyd resins, for example succinic acid, glutaric acid, adipic acid, suberic acid, azelaic acid, phthalic acid, terephthalic acid, maleic acid, fumaric acid, itaconic acid, trimellitic acid or pyromellitic acid (or the corresponding anhydrides where applicable).

The polyesters may be produced by reacting together the constituents described above under the conditions which are conventional for the preparation of such condensation polymers. Typically, the constituents are heated together at a temperature of from 180° to 260° C., if desired in the presence of a solvent and optionally also in the presence of an esterification catalyst such as zirconium octoate or tetrabutyl titanate, until the acid value has fallen to the desired level.

If desired, the polyesters may be wholly or partially neutrilised after their preparation by treatment with one or more organic bases, such as dimethylethanolamine or triethanolamine. In this way, all or part of the residual carboxyl groups in the polyester may be converted to amine salt groups. Inorganic bases also can be used to effect neutralisation, but organic bases are preferred.

Preferred compositions according to the invention comprise from 20% to 95% by weight of the polyester component designated (a) above and from 80% to 5% by weight of the polyester component designated (b) above, these percentages being as before based on the combined weights of the components (a) and (b).

The compositions according to the invention are valuable as surfactants for the emulsification of oils in aqueous media. We have found that the compositions are superior in this respect to either of the polyester components (a) or (b) when used individually. In general, polyesters of the type designated (a), that is to say those based on alk(en)yl succinic acids in which the hydrocarbon substituent group is polymeric in nature, are very effective emulsion stabilisers in the sense that oil-in-water type emulsions made with their assistance exhibit a high degree of stability of the disperse phase, but they have the disadvantage that in order to produce the emulsions in the first place a high input of shear energy into the oil and water phases is required; thus, in practice, the emulsions can only be produced with the aid of high-shear mechanical emulsifiers such as the Silverson Mixer Emulsifier. In contrast, we find that polyesters of the type (b), that is to say those based on alk(en)yl succinic acids in which the hydrocarbon substituent group is of relatively short chain-length, exhibit considerable surface activity in that they reduce the interfacial tension very siginificantly at an oil/water interface, but they are ineffective emulsifiers even when a high energy input is employed, forming only coarse emulsions which break rapidly on cessation of shearing.

The surfactant compositions of the invention, which combine these two types of polyester, enable oil-in-water emulsions to be produced under low energy conditions and at the same time confer a high degree of stability on the emulsions obtained. We find that the combination of the two types of surfactant gives, at the same total concentration of surfactant, a lower oil/water interfacial tension than is given by either surfactant alone.

Oils which may be emulsified in aqueous media with the aid of the compositions include water immiscible liquids such as aliphatic, cycloaliphatic and aromatic hydrocarbons; chlorinated hydrocarbons; mineral oils, including highly paraffinic fractions; glycerides such as vegetable oils; fish oils; and fatty acids.

Aqueous media into which the oils may be emulsified comprise water itself, including sea water and, in general, water which contains dissolved in it varying proportions of soluble ions such as those of alkali metals, ammonium, calcium, magnesium, chloride or sulphate, as well as aqueous solutions of non-aqueous, oil-immiscible but water-miscible solvents for polyalkylene glycols such as ethylene glycol and glycerol.

The choice of the compositions of the polyester components (a) and (b), and their relative proportions, which are most appropriate for a particular oil/aqueous medium system will readily be made by those skilled in the surfactant and emulsion are by reference to the common general knowledge in that art, if necessary in conjunction with simple experimentation. By way of illustration, however, the following surfactant compositions according to the invention may be mentioned as being particularly useful for the systems stated (i) 4 parts of the polyester prepared from 40.2 parts of polyethylene glycol mol. wt. 600, 46.4 parts of (polyisobutenyl) succinic anhydride having a molecular weight of approximately 1000 and 13.4 parts of tall oil fatty acids, combined with 1 part of a polyester prepared from 38.0 parts of polyethylene glycol mol. wt. 400, 5.65 parts of glycerol, 44.6 parts of dodecenylsuccinic anhydride and 11.75 parts of tall oil fatty acids; this composition is of value for emulsification of crude oils and a wide range of both aliphatic and aromatic hydrocarbons.

(ii) 3 parts of a polyester prepared from 37.5 parts of polyethylene glycol mol. wt. 600 and 62.5 parts of (polyisobutenyl) succinic anhydride having a molecular weight of approximately 1000, combined with 1 part of a polyester prepared from 32.1 parts of polyethylene glycol mol. wt. 400, 4.9 parts of glycerol, 24.1 parts of dodecenylsuccinic anhydride and 38.9 parts of tall oil fatty acids; this composition is useful for emulsifying a wide range of mineral and lubricating oils.

By the use of the surfactant compositions of the invention, stable emulsions can be obtained of oils in aqueous media containing as much as 75% by weight or more of the oil phase. The proportion of the surfactant composition which is incorporated in such an emulsion can vary widely, depending upon the nature of the two phases concerned and the particular composition being employed, but generally useful proportions are in the range of 0.5% to 50%, preferably 1% to 30%, by weight of composition based on the weight of the oil phase.

The emulsions may in general be produced by contacting the oil and aqueous phases together with the requisite proportion of the surfactant composition. Although it is not essential, it will be convenient in many cases to introduce the surfactant composition as a solution in a suitable inert liquid. Where possible, the oil phase itself is with advantage employed as the inert liquid. For some applications, a simple shaking or swirling together of the two phases in the presence of the surfactant composition may be sufficient to produce a fine particle size, stable emulsion. An example of this arises in the dispersal of oil slicks upon the sea or other waterways, where the natural movement of the water alone imparts enough energy to the system to bring about emulsification. For this purpose, the surfactant composition is preferably introduced as a solution in a liquid solvent as mentioned above; ecological considerations, however, will usually require that the solvent be of an innocuous nature, for example a high-boiling aliphatic hydrocarbon such as low-odour kerosene, rather than that the composition is dissolved in crude oil similar to that which is to be dispersed. In such a case, viz. where the surfactant composition is dissolved in a liquid which is different from, or is not a major constituent of, the oil phase which is to be emulsified, it may be necessary to equilibrate the solution before it is added to the oil and aqueous phase, in order that the benefits according to the invention of achieving good emulsification with a low input of energy may be obtained. Such equilibration may be achieved by allowing the solution of the surfactant composition in the selected liquid to stand at room temperature for a period of up to 2-3 weeks before use, but it can be accomplished more conveniently by heating the solution at a temperature in the region of 80° C. for from 4 to 6 hours. For other applications, for example the formulation of cutting oils or fluids for hydraulic transmission, the surfactant composition of the invention may, without any accompanying difficulty, be dissolved in the actual oil, e.g. a mineral oil, which is to be emulsified, optionally along with corrosion inhibitors and other conventional additives, so as to form a concentrate which can then be added directly to water. An acceptable emulsion may be obtained simply by the action of pouring the concentrate into the water, but if desired the emulsion may be further refined by subjecting it to shear with the aid of high speed agitators, emulsifiers or pumps.

Advantageous features of the surfactant composition of the invention are that they can be formulated, by suitable choice of the constituents of the two polyester components and of the relative proportions of the components, to be soluble in a wide range of mineral oils, including highly paraffinic fractions; that they give self-emulsification properties to oil concentrates; and that they give highly stable emulsions.

The invention is illustrated but not limited by the following Examples, in which parts and percentages are by weight. Each of the polymers described was made essentially according to a common procedure, as follows. The ingredients for preparation of the polymer were charged to a reaction vessel fitted with agitator, thermometer, nitrogen inlet, condenser and Dean and Stark water separator. The ingredients were heated to the temperature stated in each individual case and water of condensation was removed under reflux, the xylene present acting as entraining solvent, until the desired acid value was reached.

PREPARATION A (a) 37.024 parts of polyethylene glycol (PEG) of molecular weight 600, 53.452 parts of a commercially available polyisobutenyl succinic anhydride (PIBSA) with a molecular weight of approximately 1000 (corresponding to a polyisobutenyl chain having about 65 carbon atoms), 4.762 parts of tall oil fatty acids and 4.762 parts of xylene were condensed at 240° C. to an acid value of 14.4 mg KOH/g of polymer. The polymer had a viscosity of 3 seconds (bubble tube at 75% solids in xylene at 25° C.). The polymer (Polymer A) was obtained as a 95.4% solids solution in xylene.

PREPARATION B

Polymer B was prepared by condensing at 240° C., 38.47 parts of PEG mol. wt. 600, 44.42 parts of PIBSA as described in Preparation A, 12.86 parts of tall oil fatty acids and 4.25 parts of xylene to an acid value of 15.5 mg KOH/g of polymer. The viscosity of the polymer was 2.1 seconds in a bubble tube at 25° C. at 75% solids in xylene. The polymer solids at the end of the reaction were 92.9%.

PREPARATION C 180 parts of PEG mol. wt. 600, 264 parts of PEG mol. wt. 400, 478 parts of PIBSA as described in Preparation A, 277.2 parts of tall oil fatty acid and 34.5 parts of xylene were condensed at 240° C. to an acid value of 15.1 mg KOH/g of polymer. This Polymer C was obtained at a solids content of 95.2% and had a viscosity of 1.4 seconds (bubble tube at 75% solids in xylene).

PREPARATION D

Polymer D was made by reacting at 240° C. 422 parts of PEG mol. wt. 600, 390 parts of PIBSA as described in Preparation A, 205 parts of tall oil fatty acids and 50 parts of xylene to an acid value of 14.6 mg KOH/g of polymer. The final solids contents was 92.9% and the viscosity of the polymer was 1.6 seconds (bubble tube at 75% solids in xylene at 25° C.).

PREPARATION E 325 parts of PEG mol. wt. 600, 107 parts of PEG mol. wt. 400, 453 parts of PIBSA as described in Preparation A, 214 parts of tall oil fatty acids and 40 parts of xylene were reacted at 240° C. to give Polymer E having an acid value of 8.4 mg KOH/g of polymer, and a viscosity of 26 seconds (bubble tube at 25° C. at the final solids content of 96.1% in xylene).

PREPARATION F 35.57 parts of PEG mol. wt. 400, 5.29 parts of glycerol, 41.82 parts of dodecenyl succinic anhydride (DDSA), 11 parts of tall oil fatty acids and 6.32 parts of xylene were condensed at 215° C. to an acid value of 18.7 mg KOH/g of polymer. This Polymer F had a final solids content of 93% in xylene and a viscosity of 3 seconds (bubble tube at 75% solids in xylene and at 25° C.).

PREPARATION G

Polymer G was prepared from 380 parts of PEG mol. wt. 400, 58 parts of glycerol, 285.1 parts of DDSA, 461.1 parts of tall oil fatty acids and 66.8 parts of xylene reacted at 240° C. to an acid value of 14.1 mg KOH/g. The final solids content was 95.8% in xylene and the viscosity 1.2 seconds (bubble tube at 75% solids in xylene at 25° C.).

PREPARATION H

Polymer H was obtained by reacting at 215° C. 33.90 parts of PEG mol. wt. 400, 5.01 parts of glycerol, 35.31 parts of DDSA, 20.48 parts of tall oil fatty acids and 5.30 parts of xylene to an acid value of 19.1 mg KOH/g of polymer. The final solids content was 93.1% in xylene. Reduction to 75% concentration in xylene gave a viscosity of 2.2 seconds (bubble tube at 25° C.).

PREPARATION J

Polymer J was formed by condensing at 240° C. 36.44 parts of PEG mol. wt. 400, 3.35 parts of glycerol, 24.41 parts of DDSA, 31.70 parts of tall oil fatty acids and 4.10 parts of xylene to an acid value of 12 mg KOH/g of polymer. The final solids content was 96.5% and the viscosity at this concentration was 4.5 seconds (bubble tube at 25° C.).

PREPARATION K

Polymer K was prepared at 240° C. by condensing 400 parts of PEG mol. wt. 400, 44.2 parts of glycerol, 291 parts of DDSA, 366.3 parts of tall oil fatty acids and 42.3 parts of xylene to an acid value of 8.2 mg KOH/g of polymer. The viscosity of the polymer was 9.1 seconds (bubble tube at 25° C. at the final solids content of 96.5%).

PREPARATION L

Polymer L was formed by condensing at 240° C. 37.98 parts of PEG mol. wt. 600, 0.76 part of glycerol, 43.14 parts of PIBSA with a molecular weight of approximately 750 (corresponding to a polyisobutenyl chain having about 46 carbon atoms), 12.23 parts of tall oil fatty acids and 5.89 parts of xylene to an acid value of 9.4 mg KOH/g of polymer. The product had a final solids content of 94.2% and the viscosity was 2.0 seconds (bubble tube at 75% solids in xylene at 25° C.).

PREPARATION M

Polymer M was formed by condensing at 240° C. 31.02 parts of PEG mol. wt. 600, 6.67 parts of PEG mol. wt. 400, 1.41 parts of glycerol, 39.96 parts of PIBSA with a molecular weight of approximately 600 (corresponding to a polyisobutenyl chain having about 36 carbon atoms), 15.05 parts of tall oil fatty acids and 5.8 parts of xylene to an acid value of 5.7 mg KOH/g of polymer. The final solids content was 93.1% and the polymer had a viscosity of 1.7 seconds (bubble tube at 75% solids in xylene at 25° C.).

PREPARATION N

Polymer N was obtained by the condensation at 240° C. of 20.91 parts of PEG mol. wt. 600, 16.74 parts of PEG 400, 2.92 parts of glycerol, 30.68 parts of octadecenylsuccinic anhydride (ODSA), mol. wt. 352, 22.86 parts of tall oil fatty acids and 5.89 parts of xylene to an acid value of 7.6 mg KOH/g of polymer. The final solids content was 94.5% and the polymer had a viscosity of 1.5 seconds (bubble tube at 75% solids in xylene at 25° C.).

PREPARATION O

Polymer O was made by reacting at 240° C. 30.49 parts of PEG mol. wt. 400, 3.67 parts of glycerol, 29.27 parts of ODSA as described in Preparation N, 30.68 parts of tall oil fatty acids and 5.89 parts of xylene to an acid value of 9.8 mg KOH/g of polymer. The final solids content was 94.0% and the viscosity of the polymer at this concentration in xylene was 3.7 seconds (bubble tube at 25° C.).

PREPARATION P

Polymer P was obtained by condensing at 240° C. 30.21 parts of PEG mol. wt. 400, 4.61 parts of glycerol, 22.68 parts of PIBSA, 36.61 parts of tall oil fatty acids and 5.89 parts of xylene to an acid value of 11.0 mg KOH/g. The solids content was 94.0% and the viscosity of the polymer at this concentration in xylene was 3.2 seconds (bubble tube at 25° C.).

The PIBSA used in this preparation was one in which the polyisobutenyl chain was a trimer of isobutylene and thus contained 12 carbon atoms, being isomeric with the dodecenyl chain in DDSA which is, however, based on a tetramer of propylene.

EXAMPLE 1

5% solutions (by weight) were prepared of (a) Polymer G, (b) Polymer C, and (c) a ¼ blend by weight of Polymer G and Polymer C in a low-aromatic kerosene. When 5 ml aliquots of these solutions were poured into 100 mls of water at 20° C., solution (a) showed no emulsification, solution (b) gave a coarse emulsion which creamed rapidly and solution (c) gave a much finer emulsion which showed only slight separation after 24 hours. Similar results were obtained when the low-aromatic kerosene was replaced by a mineral oil of 40 centipoise viscosity.

After treatment for two minutes on a high shear emulsifier the emulsions derived from the above two series of solutions again behaved similarly. Sample (a) gave a very coarse emulsion which broke rapidly; samples (b) and (c) both gave fine droplet size emulsions which showed very little separation after one week.

EXAMPLE 2

The synergistic effect of reducing interfacial tension at an oil/water interface by blending Polymers B and F is illustrated in the following experiment. An interface between Kuwait Crude Oil and a 3.5% aqueous solution of sodium chloride was set up on a du Nouy tensiometer at 20° C. 100 parts per million, based on the oil phase, of the surfactants listed in the table below were added carefully as a 5% solution in an aromatic solvent (Aromasol H : "Aromasol" is a Registered Trade Mark) to the upper surface of the oil layer and the interfacial tension was measured at successive time intervals. The results are shown in the following table:

| Surfactant Reference No. | Interfacial Tension (dyne/cm) | | | | |
|---|---|---|---|---|---|
| | 15 mins | 30 mins | 1 hr. | 4 hrs. | 6 hrs. |
| Polymer B | 10 | 8.6 | 6.2 | 2.1 | 1.5 |
| Polymer F | 8.5 | 7.2 | 5.2 | 1.9 | 1.4 |
| 4/1:Polymer B | 5.2 | 2.3 | 1.8 | 1.2 | 1.0 |

-continued

| Surfactant Reference No. /Polymer F | Interfacial Tension (dyne/cm) | | | | |
| --- | --- | --- | --- | --- | --- |
| | 15 mins | 30 mins | 1 hr. | 4 hrs. | 6 hrs. |

EXAMPLE 3

One percent solutions by weight in Kuwait Crude Oil were prepared of the surfactants or surfactant blends listed in the table below. After storage for 18 hours at room temperature, 5 g of each solution was added to 95 g of a 3.5% sodium chloride solution in a beaker which was then shaken gently by hand. After noting the degree of emulsification, the beaker was transferred to a Silverson high shear emulsifier and the contents agitated at high speed for 30 seconds. The condition and stability of these emulsions were also noted.

| Surfactant Reference No. | Emulsification after hand shaking | Emulsification after high shear agitation |
| --- | --- | --- |
| 1. Polymer B | Coarse unstable emulsion. | Fine droplet size emulsion which creams slowly. |
| 2. Polymer F | No emulsification | Coarse emulsion, separates completely in less than 6 hours |
| 3. 1/1 ratio of Polymers B and F | Forms good fine droplet size emulsion | More stable emulsion than 1. |
| 4. Polymer A | No emulsification | As 1. above |
| 5. Polymer F | No emulsification | As 2. above |
| 6. 3/1 ratios of Polymers A and F. | Coarsish droplet size emulsion readily formed | Fine droplet size emulsion showing some creaming after 6 hrs |

EXAMPLE 4

15 parts of Polymer B and 5 parts of Polymer H were dissolved in 64 parts of low-odour kerosene and 16 parts of 2-butoxyethanol to form Solution L.

700 mls of 3.5% sodium chloride solution were placed in a 1-litre beaker on a magnetic stirrer. 2 mls of topped Kuwait Crude Oil were placed on the surface of the salt solution and slow speed agitation started to give a vortex about ¾" deep. 0.4 ml of Solution L was added carefully to the vortex and agitation continued for one minute. A rest period of 1 minute was followed by agitation for a further minute. After this cycle most of the oil was emulsified, the water phase was opaque with dispersed oil droplets and the emulsion showed good stability over a period of more than one week. In contrast similar solutions of Polymers B and H tested individually at equal concentrations showed little or no emulsification and poor emulsion stability.

EXAMPLE 5

Using the method described in the previous Example, a solution of 12 parts of Polymer D and 3 parts of Polymer J in 85 parts of low-odour kerosene was tested after the solution had been held at 120° C. for 3 hours and then stored for 16 hours at 35° C. This test solution produced a dense emulsion which showed good long term stability. In contrast neither Polymer D nor Polymer J tested individually at the same concentration in low-odour kerosene gave any emulsification, nor did the blend of Polymers D and J when tested within 1 hour of blending them in odourless kerosene at 20° C.

EXAMPLE 6

16 parts of Polymer E and 4 parts of Polymer K were dissolved in 80 parts of low-aromatic kerosene and the solution held at 35° C. for 72 hours. 0.4 ml of this solution were then tested for emulsification of crude oil as described in Example 4. Considerable emulsification of the oil took place during the test period and oil continued to disperse into the aqueous phase over the ensuing 24 hours. Individual solutions of the two polymers failed to give a significant level of emulsification in this test.

EXAMPLE 7

12 parts of Polymer C and 3 parts of Polymer G were dissolved in 85 parts of low odour kerosene. The sample was divided into two halves and one half was neutralised with a stoichiometric amount of dimethylethanolamine. Both samples were then tested for dispersion of crude oil by the method described in Example 4. The neutralised sample showed significantly better emulsification than the un-neutralised polymer blend, dispersing more oil throughout the water phase and giving better emulsion stability.

EXAMPLE 8

5% solutions (by weight) were prepared in low-aromatic kerosene of (a) Polymer L, (b) Polymer M, (c) Polymer N and (d) 4/1 blends by weight of each of these three polymers with Polymer G. 5 ml aliquots of these solutions were poured into 100 mls of water at 20° C. and the degree of emulsification and the stability of any emulsion formed were observed. The samples were then treated for 2 minutes on a high-shear emulsifier. The results obtained are shown in the following table:

| Surfactant Reference No. | Emulsification after hand shaking | Emulsification after high-shear agitation |
| --- | --- | --- |
| 1. Polymer L | Coarse, unstable emulsion | Fine, stable emulsion |
| 2. Polymer M | Coarse, unstable emulsion | Fine, stable emulsion |
| 3. Polymer N | Coarse, very unstable emulsion | Coarse, unstable emulsion |
| 4. 4/1 ratio of Polymers L and G | Coarse droplet size emulsion readily formed | Fine stable emulsion |
| 5. 4/1 ratio of Polymers M and G | As 4. above | As 4. above |
| 6. 4/1 ratio of Polymers N and G | Virtually no emulsification | Coarse, unstable emulsion |

EXAMPLE 9

5% solutions (by weight) were prepared in lowaromatic kerosene of (a) Polymer O, (b) Polymer P, (c) a ¼ blend of Polymer O and Polymer L, a (d) a ¼ blend of Polymer P and Polymer L. The solutions were tested as described in Example 8, with the results which are shown in the following table.

| Surfactant Reference No. | Emulsification after hand shaking | Emulsification after high-shear agitation |
| --- | --- | --- |
| 1. Polymer O | Little emulsification | Coarse, unstable emulsion |
| 2. Polymer P | Little emulsification | Coarse, unstable emulsion |
| 3. 1/4 ratio of Polymers O and L | Coarse droplet size emulsion | Fine droplet size stable emulsion |
| 4. 1/4 ratio of Polymers P and L | As 3. above | As 3. above |

I claim:

1. A surfactant composition which comprises (a) from 50% to 80% by weight of a polyester obtained by the condensation of (i) an alk(en)yl succinic anhydride of the formula

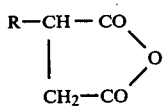

where R is a saturated or unsaturated hydrocarbon substituent derived from a polymer of a mono-olefin, the said polymer chain having a molecular weight of from about 600 to 1000 and (ii) a polyalkylene glycol which has a molecular weight of 400 to 20,000 and is soluble in water to the extent of at least 5% by weight at 25° C., the polyester so obtained containing 10% to 80%, by weight of residues of the polyalkylene glycol (ii); and (b) from 50% to 20% by weight of a polyester obtained by the condensation of (iii) and alk(en)yl succinic anhydride of the formula

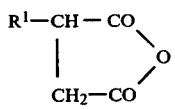

where $R^1$ is an alkyl or alkenyl radical containing from 12 to 18 carbon atoms, and (iv) a polyalkylene glycol which has a molecular weight of 200 to 4,000 and is soluble in water to the extent of at least 5% by weight at 25° C., the polyester so obtained containing from 10% to 80%, by weight of residues of the polyalkylene glycol (iv), and the stated weight percentages of the components (a) and (b) respectively in the compositions being based upon the combined weights of those components.

2. A composition as claimed in claim 1 wherein the alk(en)yl succinic anhydride of type (i) is (polyisobutenyl) succinic anhydride 3. A composition as claimed in claim 1 or claim 2, wherein the alk(en)yl succinic anhydride of type (iii) is dodecenyl succinic anhydride.

4. A composition as claimed in claim 1, wherein the polyalkylene glycol of type (ii) or type (iv) is a polyethylene glycol of average molecular weight 400 to 4000 or 200 to 1000, respectively.

5. A composition as claimed in claim 1, wherein there is incorporated, in the ingredients from which the polyester (a) or the polyester (b) is obtained, an additional ingredient selected from the group consisting of a polyol, a monobasic acid and a polybasic acid.

6. A composition as claimed in claim 1, wherein the polyester (a) or the polyester (b) is wholly or partially neutralised by treatment with one or more organic bases.

7. A composition as claimed in claim 1 wherein the polyester obtained by the condensation of (i) and (ii) and the polyester obtained by the condensation of (iii) and (iv) contained from 20% to 60% by weight of residues of the polyalkylene glycol (ii) and of the polyalkylene glycol (iv) respectively.

8. A composition as claimed in claim 1, comprising (a) 4 parts of a polyester prepared from 40.2 parts of polyethylene glycol mol. wt. 600, 46.4 parts of (polyisobutenyl) succinic anhydride having a molecular weight of approximately 1000 and 13.4 parts of tall oil fatty acids, combined with (b) 1 part of a polyester prepared from 38. parts of polyethylene glycol mol. wt. 400, 5.65 parts of glycerol, 44.6 parts of dodecenylsuccinic anhydride and 11.75 parts of tall oil fatty acids.

9. A composition as claimed in claim 1, comprising (a) 3 parts of a polyester prepared from 37.5 parts of polyethylene glycol mol. wt. 600 and 62.5 parts of (polyisobutenyl) succinic anhydride having a molecular weight of approximately 1000, combined with (b) 1 part of a polyester prepared from 32.1 parts of polyethylene glycol mol. wt. 400, 4.9 parts of glycerol, 24.1 parts of dodecenylsuccinic anhydride and 38.9 parts of tall oil fatty acids.

10. An emulsion of oil in an aqueous medium wherein there is present as surfactant from 0.5% to 50%, based on the weight of the oil phase, of a composition as claimed in any one of claims 1, 6, 8, or 9.

11. A concentrate consisting of an oil which is to be emulsified in an aqueous medium, the oil containing dissolved therein a surfactant composition as claimed in any one of claims 1, 6, 8, or 9.